(12) United States Patent
Condie

(10) Patent No.: US 10,225,373 B2
(45) Date of Patent: Mar. 5, 2019

(54) FINANCIAL-INFORMATION SYSTEMS, METHODS, INTERFACES, AND SOFTWARE

(75) Inventor: Jeremy Condie, New York, NY (US)

(73) Assignee: Thomson Reuters (GRC) LLC, New York, NY (US)

( * ) Notice: Subject to any disclaimer, the term of this patent is extended or adjusted under 35 U.S.C. 154(b) by 2396 days.

(21) Appl. No.: 10/768,598

(22) Filed: Jan. 30, 2004

(65) Prior Publication Data
US 2005/0114254 A1  May 26, 2005

Related U.S. Application Data

(60) Provisional application No. 60/524,288, filed on Nov. 21, 2003.

(51) Int. Cl.
*H04L 29/08* (2006.01)
*G06Q 30/06* (2012.01)
(Continued)

(52) U.S. Cl.
CPC ............. *H04L 67/36* (2013.01); *G06Q 30/06* (2013.01); *G06Q 40/00* (2013.01); *G06Q 40/04* (2013.01);
(Continued)

(58) Field of Classification Search
CPC ...................................................... H04L 67/36
(Continued)

(56) References Cited

U.S. PATENT DOCUMENTS 5,101,353 A  3/1992  Lupien et al.
6,347,307 B1  2/2002  Sandhu et al.
(Continued)

FOREIGN PATENT DOCUMENTS

GB  2375626  11/2002
JP  2001265977 A2  9/2001
(Continued)

OTHER PUBLICATIONS

"From Instant Messaging to Collaborative Messaging", *Parlano: True Collaboration Starts Here; 5 Keys to Enterprise Messaging Success*, A White Paper by Parlano, Inc., (Mar. 2004), 1-7.
(Continued)

*Primary Examiner* — Abhishek Vyas
(74) *Attorney, Agent, or Firm* — Norton Rose Fulbright US LLP

(57) ABSTRACT

Within the financial-services industry, there are online centers that allow brokers to match sellers with buyers of financial instruments based on indications of interest. To follow up on these indications of interest, users of such centers are now using proprietary instant-messaging (IM) systems, which allow them to instantaneously exchange text messages over the Internet with other users. The present inventor recognized that these communications are often inconvenient because the IM programs are isolated from the financial information. Accordingly, he devised systems, methods, and software that integrate IM and other communications-related functions into financial-data displays. Ultimately, one of more of these or other embodiments promise improved efficiency and convenience of online interactions not only for financial trading partners and others in the financial-services industry, but also for those in any private, public, and commercial domain where rapid or convenient online communication is desirable.

4 Claims, 4 Drawing Sheets

(51) Int. Cl.
*G06Q 40/00* (2012.01)
*G06Q 40/04* (2012.01)
*H04L 29/06* (2006.01)
*H04L 12/58* (2006.01)

(52) U.S. Cl.
CPC .............. *H04L 29/06* (2013.01); *H04L 51/04* (2013.01); *H04L 67/24* (2013.01); *H04L 69/329* (2013.01)

(58) Field of Classification Search
USPC .................................................... 705/35–45
See application file for complete search history.

(56) References Cited

U.S. PATENT DOCUMENTS

| | | | | |
|---|---|---|---|---|
| 7,212,999 | B2* | 5/2007 | Friesen | G06Q 20/10 345/440.2 |
| 7,356,500 | B1 | 4/2008 | Waelbroeck et al. | |
| 8,548,992 | B2* | 10/2013 | Abramoff | G06F 17/30994 707/726 |
| 2001/0047305 | A1* | 11/2001 | Bowen, Jr. | G06Q 10/087 705/27.1 |
| 2002/0052824 | A1 | 5/2002 | Mahanti et al. | |
| 2002/0055901 | A1 | 5/2002 | Gianakouros et al. | |
| 2002/0091621 | A1 | 7/2002 | Conklin et al. | |
| 2002/0099645 | A1 | 7/2002 | Agarwal et al. | |
| 2002/0099646 | A1 | 7/2002 | Agarwal et al. | |
| 2002/0128945 | A1 | 9/2002 | Moss et al. | |
| 2002/0128955 | A1 | 9/2002 | Brady et al. | |
| 2002/0178087 | A1* | 11/2002 | Henderson | G06Q 30/02 705/26.41 |
| 2002/0186257 | A1* | 12/2002 | Cadiz | G06F 17/30867 715/838 |
| 2003/0009421 | A1 | 1/2003 | Bansal et al. | |
| 2003/0033212 | A1* | 2/2003 | Sandhu et al. | 705/26 |
| 2003/0233416 | A1* | 12/2003 | Beyda | G06Q 10/107 709/206 |
| 2004/0024822 | A1* | 2/2004 | Werndorfer | G06F 3/0481 709/206 |
| 2004/0034591 | A1 | 2/2004 | Waelbroeck et al. | |
| 2004/0059666 | A1 | 3/2004 | Waelbroeck et al. | |
| 2004/0064420 | A1 | 4/2004 | Buist | |
| 2004/0138957 | A1 | 7/2004 | Bartolini et al. | |
| 2004/0143540 | A1 | 7/2004 | Song | |
| 2004/0172356 | A1 | 9/2004 | Agarwal et al. | |
| 2004/0193722 | A1* | 9/2004 | Donovan | H04L 51/04 709/230 |
| 2005/0021445 | A1* | 1/2005 | Caro | G06Q 10/107 705/37 |
| 2005/0055306 | A1* | 3/2005 | Miller et al. | 705/37 |
| 2005/0131797 | A1 | 6/2005 | Ananthanarayanan et al. | |
| 2005/0209903 | A1* | 9/2005 | Hunter | G06Q 10/06316 705/7.26 |
| 2007/0192227 | A1 | 8/2007 | Fitzpatrick et al. | |
| 2012/0129572 | A1* | 5/2012 | Johnstone | H04L 51/32 455/552.1 |

FOREIGN PATENT DOCUMENTS

| | | |
|---|---|---|
| JP | 2003-520366 | 7/2003 |
| JP | 2002-541588 | 12/2012 |
| WO | 01/33462 | 5/2001 |
| WO | WO 01/76119 | * 10/2001 |
| WO | WO-03065258 A2 | 8/2003 |
| WO | WO-2005/052836 A1 | 6/2005 |
| WO | WO-2007041220 A2 | 4/2007 |
| WO | WO-2007041220 A3 | 4/2007 |

OTHER PUBLICATIONS

"MindAlign for Microsoft Office Live Communication Servier 2003", *Parlano Enterprises Messaging. Instant. Persistant. Secure.*, www.Parlano. com, (2003), 1-10.

"Next Generation Communication" *Parlano; Enterprise Messaging. Instant. Persistant. Secure. The Value of Enterprise Instant Messaging*, A White Paper by Parlano, Inc., (Oct. 2004), 1-9.

"Thomson Financial Integrates Trade and Transaction Services Within Thomson One: Thomson AutEx for Buy Side Traders Integrated Within Thomson ONE Open Framework", http://web.archive.org/web/20040610234032/http://www.advisorpage.com/modules.php?name=News&file=print&sid=1042, (Oct. 13, 2003; archived Jun. 10, 2004), 2 pgs.

"www.indii.com—Jun. 4, 2001", Obtained from: http://web.archive.org/web/20010604120607/http://www.indii.com/index.html, and related pages linked thereto, (At least as early as Jun. 4, 2001), 13 pages.

"www.indii.com—May 29, 2002", Obtained from: http://web.archive.org/web/20020529135230/http://www.indii.com/, and related pages linked thereto, (At least as early as May 29, 2002), 13 pages.

"www.indii.com—Sep. 7, 2003", Obtained from: http://web.archive.org/web/20030907070442/http://www.indii.com/index.html, and related pages linked thereto, (At least as early as Sep. 7, 2003), 11 pages.

"www.indii.com—Apr. 2, 2004", Obtained from: http://web.archive.org/web/20040402015803/http://www.indii.com/index.html, and related pages linked thereto, (At least as early as Apr. 2, 2004), 13 pages.

"www.indii.com—Apr. 28, 2004", Obtained from: http://web.archive.org/web/20040428200642/http://www.indii.com/, and related pages linked thereto, (At least as early as Apr. 28, 2004), 13 pages.

"www.indii.com—Sep. 18, 2004", Obtained from: http://web.archive.org/web/20040918033105/http://www.indii.com/, and related pages linked thereto, (At least as early as Sep. 18, 2004), 16 pages.

"www.indii.com—Oct. 16, 2004", Obtained from: http://web.archive.org/web/20041016134223/http://www.indii.com/index.html, and related pages linked thereto, (At least as early as Oct. 16, 2004), 16 pages.

"www.indii.com—Oct. 31, 2005", Obtained from http://www.indii.com, and related pages linked thereto, (At least as early as Oct. 31, 2005),21 pages.

European Application Serial No. 04811776.6, Non-Final Office Action dated Sep. 15, 2006, 7 pgs.

European Application Serial No. 04811776.6, Response filed Jul. 9, 2007 to Non-Final Office Action dated Sep. 15, 2006, 13 pgs.

International Application Serial No. PCT/US2004/039115, International Search Report dated Mar. 30, 2005, 5 pgs.

International Application Serial No. PCT/US2004/039115, Preliminary Report on Patentability dated Jun. 1, 2006, 8 pgs.

International Application Serial No. PCT/US2004/039115, Written Opinion dated Mar. 30, 2005, 8 pgs.

U.S. Appl. No. 11/239,663, Non-Final Office Action dated Mar. 18, 2008, 26 pgs.

U.S. Appl. No. 11/239,663, Response filed Sep. 18, 2008 to Non Final Office Action dated Mar. 18, 2008, 12 pgs.

U.S. Appl. No. 11/239,663, Non-Final Office Action dated Dec. 24, 2008, 16 pgs.

Application Serial No. PCT/US06/37857, International Search Report dated Nov. 29, 2007, 7 pgs.

Application Serial No. PCT/US06/37857, Written Opinion dated Nov. 29, 2007, 11 pgs.

"NYFIX(r)—NYFIX Natural9", [Online]. (c) 2006 NYFIX Inc. [archived Jul. 21, 2006]. Retrieved from the Internet: <URL: http://web.archive.org/web/20060721050620/http://www.nyfix.com/buyside-solutions/transaction-services/nyfix-natural>, 1 pg.

Atwell, Scott, et al., "Financial Information Exchange Protocol (FIX)", *FIXML 4.4 Schema Version Guide*, Version 4.4 Schema, (Jan. 9, 2004), 51 pgs.

Japanese Application Serial No. 2006-541602, Office Action dated Jun. 1, 2009, 7 pgs.

Office Action dated Feb. 13, 2014, in Japanese Patent Application No. 2009-251527 (with English language translation).

Office Action in Japanese Patent Application No. 2009-251527 dated Jul. 12, 2012 (with English Translation).

Office Action dated Jun. 18, 2012 in European Application No. 10 075 655.0.

(56) References Cited

OTHER PUBLICATIONS

Office Action dated Jul. 3, 2012 in European Application No. 04 811 776.6.

* cited by examiner

FINANCIAL-INFORMATION SYSTEMS, METHODS, INTERFACES, AND SOFTWARE

RELATED APPLICATIONS

This application claims priority to U.S. Provisional patent application 60/524,288, which was filed on Nov. 21, 2003 and is incorporated herein by reference.

COPYRIGHT NOTICE AND PERMISSION

One or more portions of this patent document contain material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2003, Thomson Corporation.

TECHNICAL FIELD

The present invention concerns online data systems and instant-messaging systems, particularly such systems in the context of the financial-services industry.

BACKGROUND

The 1990s witnessed a proliferation of computer technology into homes and businesses. During this time, computers, fueled by growth of the much-heralded Internet, advanced from facilitating tasks, such as word processing and bookkeeping, to become everyday communications tools, fast approaching the commonness of telephones and televisions. As a result, virtually every sector of public, private, and commercial life has been affected in some way by the power and reach of today's computer technology.

The financial-services industry, for example, has recently seen not only the emergence of Internet-based trading platforms that allow online trading of stocks, bonds, and commodities, but also the emergence of online listing centers that allow brokers to match sellers with buyers of securities based on listed "indications of interest." A seminal example of such an online center is the Autex™ block-trading service from Thomson Corporation of Stamford, Conn. This service provides a secure and convenient means for investment firms and other large-block traders to broadcast their desires, or interests, in purchasing or selling particular stock or other security instruments to a group of securities traders. Traders viewing these indications in an online list can then respond by phoning, faxing, or emailing contacts at these investment firms to begin negotiations and ultimately complete the transactions.

More recently, users of such services have started using proprietary instant-messaging (IM) systems, which allow them to instantaneously exchange text messages over the Internet with other users that are equipped with IM-capable workstations, laptops, mobile telephones, or pagers. When available, instant messaging can save traders significant time over other modes of communications, such as telephone, fax, and even email.

However, the present inventor has recognized that the IM functionality used to facilitate online trading or other market-related communications is accessed separately (or outside the context) of the financial information that drives these communications, and forces users to take numerous steps to initiate and complete a communication. For example, when viewing financial data, such as an indication of interest in an Autex™ data window on her monitor, a user seeking to send an instant message to a relevant trading partner uses her keyboard, mouse, or other graphical pointer to switch out of the Autex™ window into an IM program (or application) to view her buddy list. The buddy list, a personal address book of contacts that use instant messaging, enables her to view whether the trading partner is among her listed buddies and if so whether he is online and available—that is, present—for instant messaging.

If the trading partner is present, then the user typically uses her mouse to request that the IM application open an IM window for communicating with him. She then switches back to the Autex™ window to select and copy text from the displayed indication of interest, which she then pastes into the IM window. Then after typing any other desired text, such as an acceptance or counteroffer, into the IM window, she clicks a button to send the message to an IM-capable device used by the trading partner.

Unfortunately, this series of user actions is not only time consuming, but can result in lost trade opportunities. Accordingly, the present inventor has recognized a need for better ways of accessing and using instant messaging as well as other forms of communications.

SUMMARY

To address this and/or other limitations, the present inventor devised systems, methods, interfaces, and software that integrate communications functionality, such as presence indication, into financial-data displays. One exemplary financial-information system provides indications of interest in stocks, bonds, commodities or derivatives, to subscribing users via the Internet, with one or more of the indications logically associated with a presence indicator. The presence indicator signals to users whether a trading counterparty associated with the indication is currently available to communicate via instant messaging.

Some embodiments extend the concept of an integrated presence indication to other types of data, to multiple instant-messaging systems, and/or to other types of communication systems that provide presence detection. Moreover, some embodiments allow a user to open an instant-messaging window from the context of a financial-data window, with the opened window containing a predetermined instant-messaging address and text based on the financial-data window.

Ultimately, one of more of these or other disclosed embodiments promise improved efficiency and convenience of online interactions not only for financial trading partners and others in the financial-services industry, but also for those in any private, public, or commercial domain where rapid or convenient communication is desirable.

DETAILED DESCRIPTION OF EXEMPLARY EMBODIMENTS

The following description, which incorporates the figures and the appended claims, describes and/or illustrates one or more exemplary embodiments of one or more inventions. These embodiments, offered not to limit but only to exemplify and teach the invention(s), are shown and described in sufficient detail to enable those skilled in the art to make and use the invention(s). Thus, where appropriate to avoid obscuring the one or more inventions, the description may omit certain information known to those of skill in the relevant art.

Exemplary Financial-Information System

Figure 1:
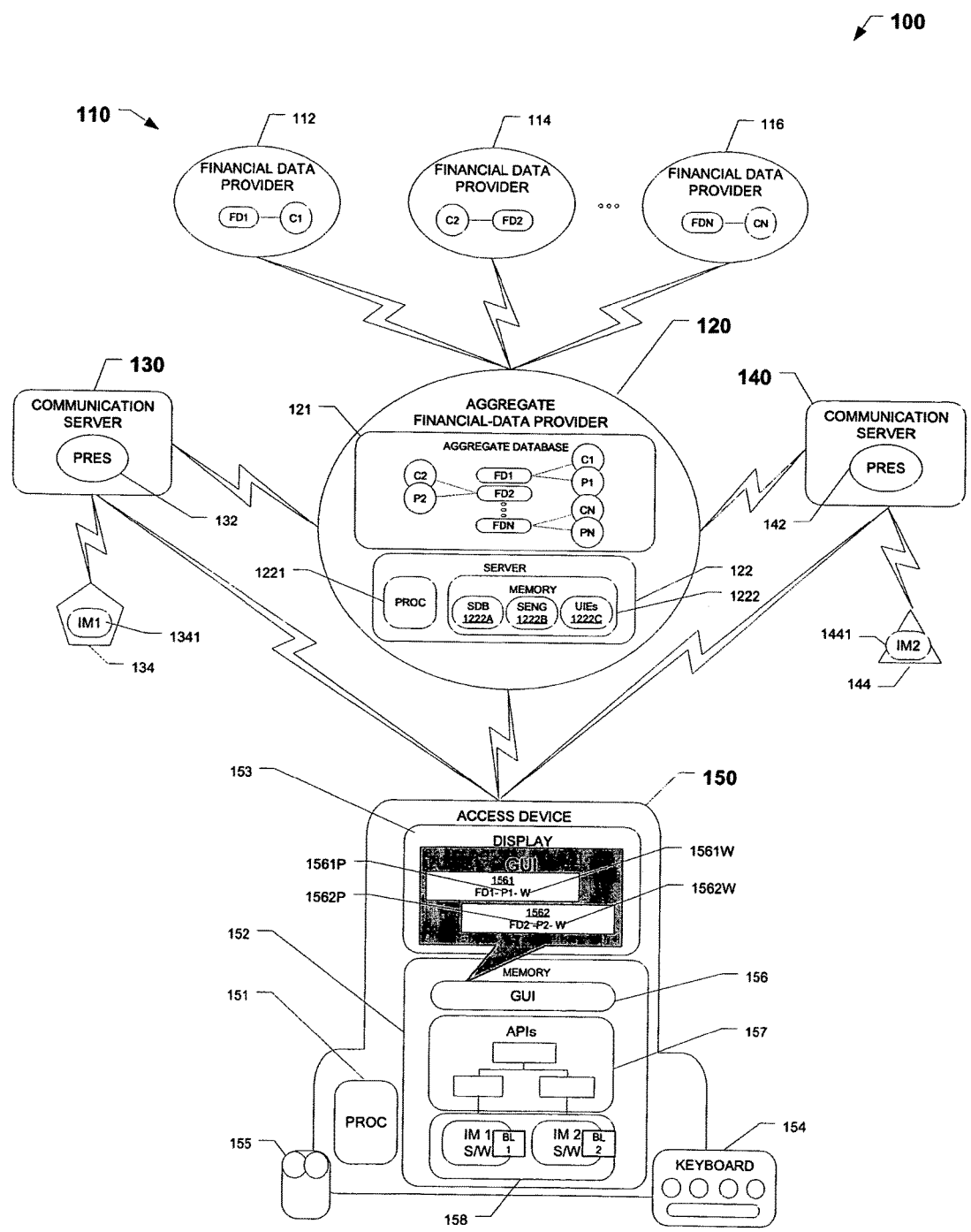
FIG. 1 is a block diagram of an exemplary financial-information system 100 corresponding to one or more embodiments of the present invention.

FIG. 1 depicts an exemplary financial-information system 100 that incorporates one or more teachings of the present invention. System 100, broadly adaptable to any form of electronic commerce, includes financial-data providers 110, an aggregate financial database 120, communications servers 130 and 140, and one or more access devices 150.

Specifically, financial-data providers 110, which provide various forms of financial or economic data to subscribers via one or more communications links or channels, include financial-data providers 112, 114, and 116. In the exemplary embodiment, providers 112, 114, and 116 are subsidiaries or divisions of a common financial-data provider. However, in other embodiments, one or more of the providers are independent of one or more of the other providers.

More specifically, providers 112, 114, and 114 each store and distribute one or more financial-data sets, of which financial-data sets FD1, FD2, and FDN are generally representative. Data sets FD1, FD2, and FDN respectively include or are logically associated with contact or source-identifying data C1, C2, and CN. Data C1, C2, and CN identifies one or more source individuals, groups, entities, or institutions that developed, authored, own, or are otherwise associated with respective data sets FD1, FD2, and FDN. The source-identifying data includes one or more names, online aliases, entity affiliations, entity addresses, network addresses, telephone numbers, pager numbers, and instant-messaging aliases or user identifiers.

Figure 3:
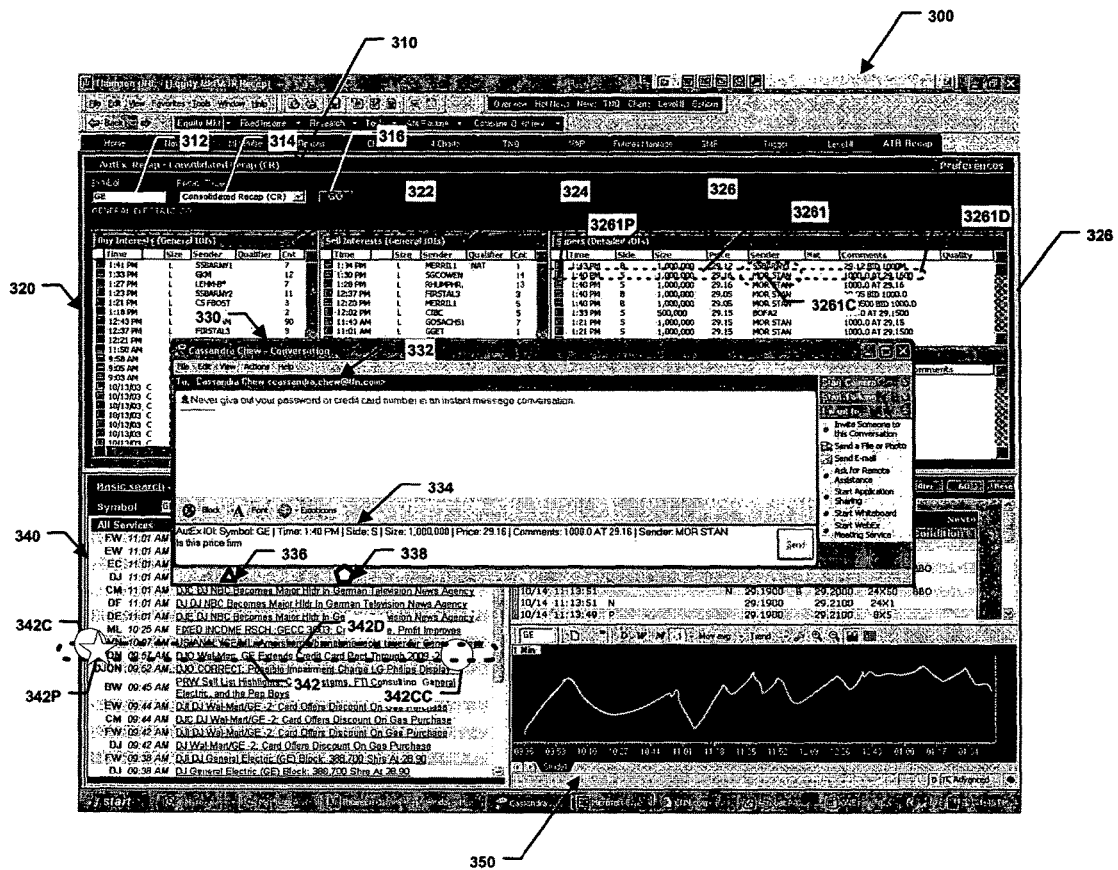
FIG. 3 is a facsimile of an exemplary graphical-user interface 300 corresponding to one or more embodiments of the present invention.

In the exemplary embodiment, one or more financial-data sets from provider 112, such as data set FD1, includes one or more indications of interest (IOIs) in buying, selling, or otherwise transacting in one or more economic or financial instruments, such as stocks, bonds, commodities, options, derivatives, and so forth, from one or more specified or unspecified economic trading entities or parties, such as individual investors, individual brokers, brokerage firms, retail banks, investment banks, mutual-fund operators, venture capitalists, etc. (FIG. 3 shows a variety of exemplary indications of interest in display regions 322, 324, and 326.) Other embodiments include other forms of pre-trade or commercial data. For instance, some embodiments may include listings related to the sale or purchase of other forms of property, such as consumer goods or services, or real property.

Similarly, one or more data sets of financial-data provider 114, for example data set FD2, include news and/or analysis of markets, market sectors, industries, companies, particular economic instruments, etc. And, one or more of the data sets of financial-data provider 116, for example data set FDN, includes current and/or historical market performance data related to particular economic instruments, etc.

In some embodiments, one or more of data sets FD1, FD2, and FDN include or are logically associated with data handling preferences or restrictions, such as whole or partial access or distribution restrictions, temporal limits, archival instructions, etc. For example, in one embodiment, a financial-data provider (or a user submitting data to such a provider) can control or limit access by encrypting one or more portions of the data, such as all or part of the source-identifying information. Variants of this embodiment may restrict or regulate access to associated presence information by controlling who or what can access presence, when can presence be accessed, what type of presence can be access (active, idle, inactive), and what type of device or device attributes are included with any accessible presence information.

Providers 112-116 are coupled or couplable, for example, via an Internet Protocol (IP) network or other form of permanent, temporary, dedicated, shared wireless or wireline communication link to aggregate financial-data provider 120.

Aggregate financial-data provider 120 includes an aggregate database 121 and a server 122. Database 121 aggregates data from financial-data providers 112-116 into one or more data structures, such as lookup tables or relational databases, and logically associates or otherwise aggregates respective presence data P1, P2, and PN from communications servers 130 and 140, with respective financial-data sets FD1, FD2, and FDN. Some embodiments retrieve and associate the presence data by querying communication servers 130 or 140 based on the source-identifying data C1, C2, and CN. In some variants of this embodiment, provider 120 queries only one of communication servers 130 and 140 based on the type or specific nature of the source-identifying data. However, in other variants, provider 120 may lack sufficient information to exclude one or more communication servers from a given query and thus queries each of the communication servers. Still other embodiments aggregate the presence data at the client level based on client buddy lists, which may reside within the client and/or within one or more communications servers.

In addition to its aggregate database 121, aggregate financial-data provider 120 includes one or more servers, such as server 122, to serve data in active or dynamic forms, such as hypertext markup language (HTML), extensible markup language (XML), or more generally data in combination with interactive control features (or user interface elements). Server 122 includes a processing unit 1221 and a memory 1222.

Processing unit 1221, which is generally representative of one or more local or distributed processors, virtual machines, or other functionally similar data-processing or computing arrangements, is coupled to memory 1222.

Memory 1222, which can take the form of an electronic, magnetic, or optical computer- or machine-readable medium, includes one or subscriber databases 1222A, one or more search engines 1222B, and other modules and software, such as browser-compatible user-interface elements (UIEs) 1222C. UIEs 1222C include one or more Java scripts, applets, servlets, CGI (common-gateway interface) programs, scripts, ActiveX controls, remote-invocation objects, or other related software and data structures for serving data in association with desired interactive, user-interface features, objects, modules, or elements to clients of various "thicknesses." One or more portions of UIEs 1222C work in conjunction with a client processor, operating system, or other related components to define one or more portions of a browser-based user interface within a client. (In some embodiments, server 122 hosts browser or other access software used by client devices to access and interact with data of aggregate database 121, and in other embodiments, the server downloads access software to the clients for client-side execution.)

Communication servers 130 and 140 provide instant-messaging communication service for two independent instant-messaging systems or networks. (In some embodiments, one or more of the communication servers facilitates another form of communication other than instant messaging, for example voice or email communications. In some embodiments, one or more of servers 130 and 140 take the form of an AOL™ instant-messaging server, a Microsoft™ Live Communications Server, or other public or private instant-messaging server. Also, in some embodiments, one or more communications servers is part of aggregate financial-data provider (or data center) 120.

In addition to one or more processors, memory devices, and other forms of hardware, firmware, and software (not shown separately in the Figure), servers 130 and 140 include respective presence databases 132 and 142 and are coupled to respective access devices 134 and 144. In the exemplary embodiment, each set of presence data includes a list of identifiers or aliases for users of at least one instant-messaging system, with each alias logically associated with a current IP address for an IM-capable device. Some embodiments associate each alias with buddy lists and user preferences regarding who or what can access presence, when presence can be accessed, what type of presence can be access (active, idle, inactive), and what type of device or device attributes are included with any presence information. The presence data is accessible by access devices, such as access devices 134 and 144.

Access devices 134 and 144, which may take the form of a personal computer, workstation, personal digital assistant, mobile telephone, or any other network communication device, include respective types of instant-messaging software 1341 and 1441. This software enables the access devices to not only register and update their presence data and status with respective servers 130 and 140 (and/or other access devices), but also to communicate via instant-messaging or other form of live or real-time, and in some cases non-real-time (for example email) communications with access device 150.

Access device 150 is not only communicatively coupled or couplable to aggregate database 120, but also generally representative of one or more access devices. In the exemplary embodiment, access device 150 takes the form of a personal computer, workstation, personal digital assistant, mobile telephone, or any other device having a suitable user interface and communication capability. (In some embodiments, access devices 134 and 144 have the same or similar structure as access device 150.)

In addition to one or more processors (or processing circuits) 151 and memory devices (or circuits) 152, access device 150 includes a display 153, a keyboard 154, a graphical pointer or selector (mouse) 155, a graphical user interface 156, one or more application program interfaces 157, and a communications module 158.

Graphical user interface 156, which resides as coded instructions and data in memory 152 and is displayed or displayable in whole or in part on display 155, includes one or more data-display regions, such as representative display regions 1561 and 1562. Display regions 1561 and 1562 are respectively defined in memory not only to display one or more portions of financial-data sets FD1 and FD2, as text, images, symbols, or other semantic forms, but also to display or provide presence indicators 1561P and 1562P and interactive control features (user-interface elements or widgets) 1561W and 1562W. In the exemplary embodiment, the display regions and control features are defined in whole or part by server 122, specifically its UIEs 1222C, which work in cooperation with a client operating system or browser software.

More specifically, presence indicators 1561P and 1562P indicate whether respective entities associated with the source-identifying data for financial-data sets FD1 and FD2 are deemed present within the communication network(s) served by communication server 130 or communication server 140. In the exemplary embodiment, each presence indicator assumes the form of an icon for its corresponding instant-messaging or alternative communication system. For example, if the entity associated with the financial-data set FD1 is associated with the AOL or Microsoft instant-messaging system, an AOL- or Microsoft-approved or licensed icon can be displayed in a full-color, highlighted, and/or blinking form to indicate current presence or in a muted or "grayed out" form to indicate no presence.

Some embodiments omit display of the icon completely to indicate no presence for the associated entity. Other embodiments blink, highlight, underscore, or otherwise differentiate the color or font of the financial data itself to facilitate user discernment of presence or non presence. Yet other embodiments indicate data sets with affirmative presence by displaying or grouping them in a separate portion of the window, or provide options for users to invoke a show-only-those-present option. Moreover, still other embodiments provide a control feature which allows the financial data, for example, indications of interests, to be sorted or otherwise organized based on presence data.

Some embodiments may give preferential treatment of one instant-messaging system (more generally communication system) over another. For example, one embodiment may display presence indicators for one instant-messaging system and omit those for another where information for both is available to the system. The preference can be based on user-indicated preference or an agreement between the data provider and the instant-messaging system.

The communication-system preference can be manifested in a number of ways. One way is to use specific icons for one or more preferred instant-messaging systems, and using a generic icon for all other instant-messaging systems. Others ways to indicate IM preferences include visually highlighting the icons for one or more preferred IM systems using different relative sizes or blinking techniques, or to intentionally accelerate the process of invoking IM communications with some IM systems relative to others. Providing preference for one or more IM systems (or generally communication systems) over others may allow owners of the financial-data system to obtain revenues or other rights of economic value from communications providers.

Interactive control features 1561W and 1562W are associated with one or more portions of the display regions to receive user commands or present additional associated portions of their respective financial-data sets or other data to the user. In the exemplary embodiment, control features 1561W and 1562W are associated with respective presence indicators 1561P and 1562P, and are independently or jointly selectable via a user-controlled graphical pointer or other interface device to invoke or cause processor 151 to communicate information or command signals associated with one or more of the corresponding display regions to one or more of application program interfaces 157.

Application program interfaces 157 includes at least one interface for receiving information associated with one or more of the selected interactive control features and communicating in response to this received information with one or more of communications applications or programs within communication module 158. (In the exemplary embodiment, this communication entails causing one or more of the communications modules 158 to open an instant-messaging or other form of communication window based on data associated with the display region and other functionality described below.)

Communications module (programs or applications) 158 includes communications software for two or more messaging or external communication systems, for example instant-messaging software IM1 and IM2 and associated buddy lists BL1 and BL2. (The buddy lists may be stored on one or more of communication servers 130 and 140.) In the exemplary embodiment, each instant-messaging software facilitates not only initiating, editing, sending, and receiving instant messages, but also establishing, maintaining, and updating buddy lists, and associated user preferences. Some embodiments may provide a single instant-messaging application that is compatible with two or more otherwise incompatible instant messaging or communications services. Still other embodiments may include combinations of single-system communication modules and multi-system communications modules.

Exemplary Method of Operation

Figure 2:
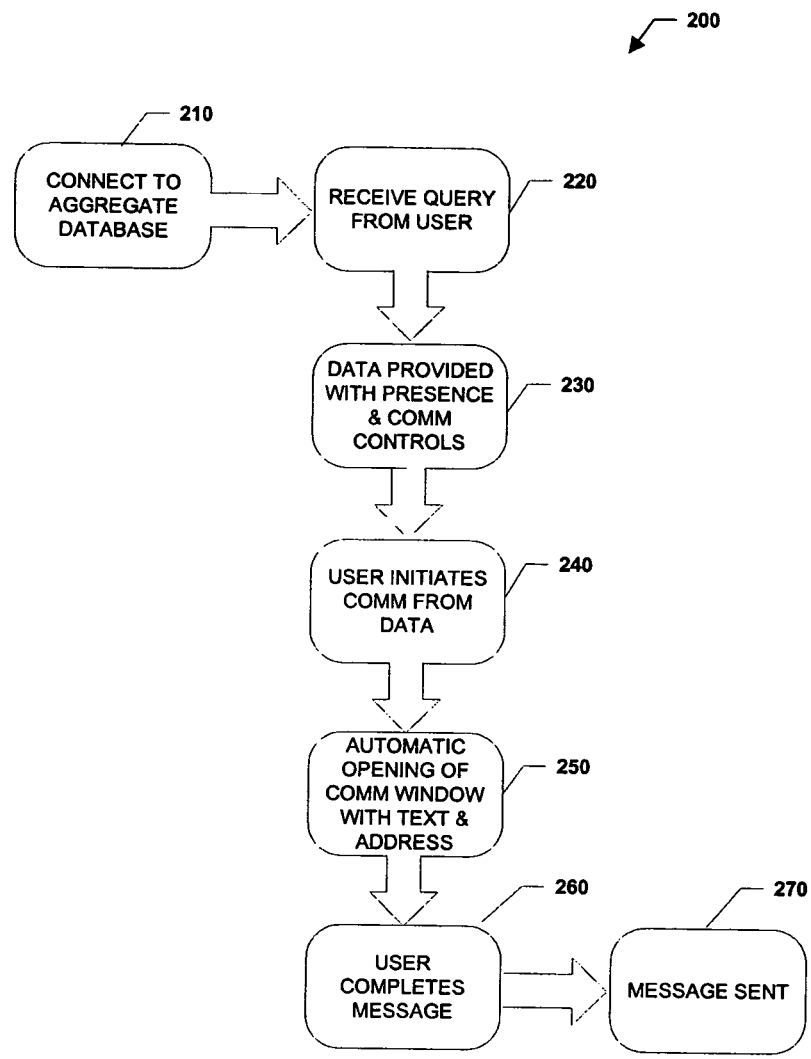
FIG. 2 is a flow chart 200 illustrating one or more exemplary methods of operating a financial-information system and corresponding to one or more embodiments of the present invention.

FIG. 2 shows a flow chart 200 of one or more exemplary methods of operating system 100. Flow chart 200 includes blocks 210-270, which are arranged and described in a serial execution sequence in the exemplary embodiment. However, other embodiments execute two or more blocks in parallel using multiple processors or processor-like devices or a single processor organized as two or more virtual machines or sub processors. Other embodiments also alter the process sequence or provide different functional partitions to achieve analogous results. Moreover, still other embodiments implement the blocks as two or more interconnected hardware modules with related control and data signals communicated between and through the modules. Thus, the exemplary process flow applies to software, hardware, and firmware implementations.

At block 210, the exemplary method begins with a user initiating communicative coupling of an access device, such access device 150, to aggregate database 120. In the exemplary embodiment, this entails the user directing a browser or other access software on device 150 to a webserver for aggregate database 120 and subsequently logging into aggregate database 120 using appropriate username, password, and/or other authentication techniques. Execution continues at block 220.

In block 220, the user, interacting with user interface 156, indicates a desire to see data related to a specific economic instrument or entity. In the exemplary embodiment, this entails the user sending a query by selecting a stock ticker symbol or company name from a menu using a mouse, keyboard, or other interface device, or alternatively just keying a particular company name associated symbol or selecting a particular icon. In some embodiments, the user maintains a watchlist of specific companies or economic instruments, and aggregate data related to these entities or instruments is automatically or selectively communicated from the aggregate database to the access device after login. The user then has an interface option to focus on particular portions of the watchlist. Thus, content from database 120 can be "pulled" to access device 150 pursuant to queries, and "pushed" to the device, pursuant to login or other events. Execution continues at block 230.

Block 230 provides requested data with integrated presence indication and/or interactive communications control features. In the exemplary embodiment, this entails aggregate database 120 communicating one or more financial-data sets to access device 150, based on the user query. The data, which includes an aggregation of two or more of data sets FD1, FD2, FDN along with one or more corresponding presence data sets P1, P2, PN, is then presented to the user via display 153 and graphical user interface 156.

In some embodiments, aggregate database may not include presence data or may include stale presence data. In such embodiments, associated software modules, for example, one or more of application program interfaces (APIs) 157 may query, based on the source-identifying information, one or more of communications servers 130 and 140 directly or through communication module 158 to obtain presence information related to one or more of the financial-data sets from aggregate database 120.

Other embodiments may also query an existing personal buddy list, such as BL1 or BL2, within the access device or within an external database, such as a relevant communication server, based on the source-identifying information for relevant presence information. Still other embodiments may query a generic (multi-user or aggregate) buddy list within one or more of the communications servers, to determine presence information relevant to one or more of the displayed financial-data sets. (In some embodiments, users can associate one or more of their contacts in a buddy list with data from one or more of the financial-data providers to facilitate providing presence indicators.) Execution continues at block 240.

Block 240 initiates a communication session with an entity associated with one or more of the displayed financial-data sets. In the exemplary embodiment, this occurs in response to the user selecting or actuating an interactive control feature or user-interface element, such as control feature 1561W or 1562W, which is associated with a portion of the displayed data. In response, the graphical user interface communicates via one or more of application program interfaces 157 with an appropriate communication module, such as communication module 158. (Some embodiments may include a routing API that determines which of one or more other applications program interfaces are to further respond to the actuated control feature(s)). Execution then continues at block 250.

In block 250, one or more of the communications modules (or the processor operation under control of one or more of the modules) automatically opens one or more communication dialogue windows. In the exemplary embodiment, opening of the dialogue window includes automatically populating one or more fields of the window with one or more predefined portion of the financial-data set. For example, in embodiments where the selected command feature is associated with an indication of interest for a particular stock, bond, commodity, or other economic instrument, the communication window includes the text of the indication of interest as well as an instant-messaging address for an entity associated with the indication.

Some embodiments may allow for automatic opening and population of two or more communication windows by a user selecting two or more of the data sets within graphical user interface 156. This feature, for example, may be useful for establishing a private chatroom for an online auction or multiparty earnings briefing. Also, in some embodiments, the communication windows pertain to an email application, or to a network video or audio conference. This feature can, in some embodiments, facilitate opening of communications windows for separate communications modules, for example two different instant-messaging applications or voice-communications applications. Execution advances to block 260.

In block 260, the user completes the message. In the exemplary embodiment, completion of the message entails editing and/or adding text or data into the messaging window using cutting and pasting or other text-entry methods. However, other embodiments provide a set of specific user- or administrator-defined text menus or icons that may be added to the message under construction with aid of function keys, hotkeys, macros, pointers, etc.

For example, some embodiment provides a set of one or more icons, analogous to "emoticons," which convey specific information and which may be added by selection using the graphical pointer. Other embodiments provide specialized auto-edit capabilities that recognize certain character strings as being associated with particular words or text strings, and upon detecting their entry in the communication window, completes the words or text string within the window to save the user keystrokes. Still other embodiments allows the user to drag and drop icons into the message window using a graphical pointer, with the icons decoded into corresponding administrator- or user-defined text within the communication window.

In block 270, one or more of the communications modules send the message to the one or more recipients. In the exemplary embodiments, this occurs in response to the user selecting the send button on the communication window. In some embodiments, however, the message is sent in response to insertion of predefined closing text or signature icon, which includes a user- or administrator-defined closing signature along with an auto-send trigger. Thus, insertion of this icon would result in automatic transmission of the message. Some embodiments include screening or filtering functions to reduce the risk that users will send undesirable or inappropriate messages. These filters may be triggered for offer or acceptance type communication that would be difficult to retract or that would exceed some transactional quantity or value limit for the sender or other risk-related threshold.

Some embodiments provide one or more interactive control features (or user-interface element) on graphical user interface 156, which upon selection or invocation causes automatic execution of blocks 240, 250, 260, and 270, based on predefined text. For example, one control feature may automatically send a routine question, such as "Is this Offer Firm?" via the communication module to a contact. Another control feature may automatically send standard order-execution terms. Some variants of these embodiments may include filters to mitigate risk of errant or unauthorized communications.

Also, in some embodiments, block 250 entails open a communications window for an email application or audio- or audio-video-conferencing application in addition to or as alternatives to an instant-messaging window, with the window populated with an associated email, phone number, or VoIP address rather than an instant-messaging address.

Exemplary Graphical User Interface

FIG. 3 shows an exemplary graphical user interface 300 used with some embodiments of the systems and methods described above. Specifically, interface 300 includes an interactive control region 310, an interactive financial-data region 320, a communication window region 330, an interactive financial-data region 340, and an interactive financial-data region 350.

Interactive control region 310 includes a symbol input region 312, a data-type input region 314, and a command-submission feature 316. Symbol input region 312 accepts stock or other financial instrument identification systems, such as GE, the ticker symbol for General Electric Company. In some embodiments, region 312 takes the form of a pull-down menu listing all available ticker symbols or a predefined subset of symbols, for example, those most recently used and/or those from a user-defined watchlist. Data-type input region 314 accepts a data-type descriptor or name, such as Consolidated Recap, which designates the type and form of data the user desires. In the exemplary embodiment, this region provides a number of possible options in the form of a pull-down menu. However, other embodiments may use other user-interface features for presenting such options.

The command-submission feature 316, for example, a "go" button, is selectable to invoke submission of data from input region 312 and 314 to aggregate data provider 120 (or more precisely server 122.) In response, the provider populates interactive financial-data regions 320, 330, and 340 with corresponding data sets related to the content of input regions 314 and 316, one or more of which provide integrated presence data and/or communications functionality as describe for one or more embodiments above.

Specifically, interactive financial-data region 320 includes a general buy-interest portion 322, a general sell-interest portion 324, and a detailed-interest portion 326, each of which lists one or more indications of interest and corresponding presence indicators. For example, detailed-interest portion 326 includes an indication listing 3261, which includes interest data 3261D, a presence indicator 3261P, and an interactive control feature 3261C. Interest data 3261D includes a time stamp (1:40 PM), a buy-or-sell-side indicator or text field (B or S), a size or quantity indicator or text field (1,000,000), a price indicator or text field (29.16), a sender identifier or text field (MOR STAN), a comments indicator or text field, and a quality indicator or text field.

Presence indicator 3261P indicates whether a contact associated with the indication listing, for example a user-, administrator-, or sender-defined counterparty associated with the sender text field (MOR STAN, short for Morgan Stanley) is presently available for instant messaging or other form of communications. Presence indicator 3261P can take any number of forms, as noted in the description of interface 156.

Interactive control feature 3261C, which may be associated with any portion of indication listing 326, such as a sender text field, is selectable to open an instant-messaging (or other form of communications window), such as window 330. Interactive control feature 3261C may take any number of forms, such as a link or pull-down communication menu associated with presence indicator 3261P or another portion of the indication listing. A pull-down menu may list one or more present contacts and thus allow a user to select one or more parties for instant messaging or an alternative form of communications, such as voice or video conference.

Window 330, upon opening, is automatically populated with data from the indication listing and directed to a contact associated with the indication. In the example shown, the window includes an address 332 (Cassandra.chew@tfn.com) based on a buddy-list contact associated by the user, an administrator, sender, or other entity, with indication sender Morgan Stanley and indication text 334 based on indication listing data 3261D.

Additionally, window 330 includes automatic messaging icons 336 and 338 which as described above relative to FIG. 2, can be actuated or dropped into a portion of defined portion of window 330, such as an input region, to cause automatic insertion of predefined text or can be actuated or dropped into the window to cause both automatic insertion and automatic sending of the message. Some embodiments display the text of the message associated message as well as instructions for use of these icons upon sensing a cursor "rollover."

Interactive financial-data region 340 lists one or more news or analysts reports related to the content of input region 314. For example, region 340 includes a report listing 342, which includes a presence indicator 342P, an associated interactive control feature 342C, a report description 342D and an interactive control feature 342CC. Presence indicator 342P indicates whether an author, analyst or other party associated with the report description are present for interactive communications. Analogous to control feature 3261C, control feature 342C is selectable to automatically open a communication window which is automatically populated with at least a portion of the report listing or other associated data. In some embodiments, a hyperlink to the listed report is automatically included in the communication window. Report description 342D provides a brief description of an associated report, such as a title. And, control feature 342CC, which in some embodiments takes the form of a hyperlink, functions to allow access to a document containing the associated report. Control features 342C and 342CC may not be visible in some embodiments until a cursor "rolls over" associated elements on the display.

Interactive financial-data region 350 includes market performance data related to the content of input region 314. In the exemplary embodiment, region 350 includes a graph 352 of a market performance parameter, such as market price, over time.

Figure 4:
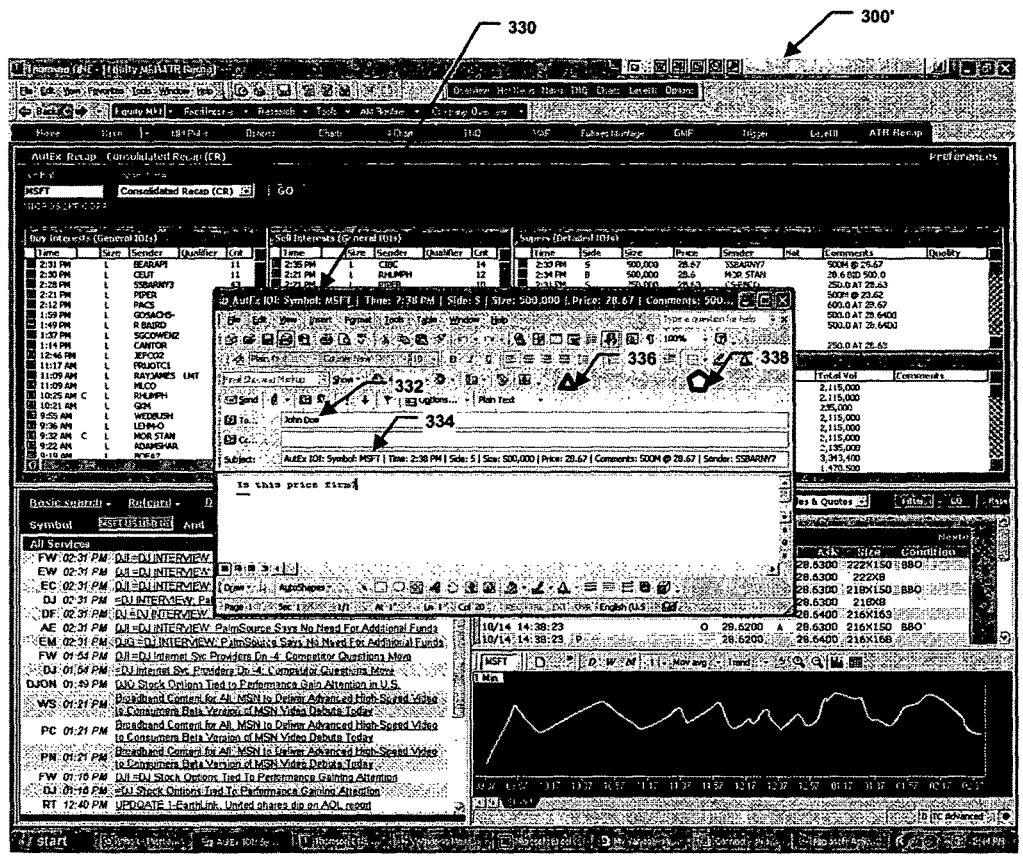
FIG. 4 is a facsimile of exemplary graphical user interface 300' corresponding to one or more embodiments of the present invention.

FIG. 4 shows a variation of interface 300, denoted 300', in which window 330 pertains to an email application, such as the Microsoft™ Office™ application, rather than an instant-messaging application. In this instance, the window is automatically populated with an email address and text based on the data associated with the interactive control feature used to launch the window. In some embodiments, the email version of window 330 is displayed in response to user selection to initiate communications with related to financial data that has an associated contact that is not present for interactive communications.

Conclusion

In furtherance of the art, the present inventor has recognized that instant messaging and other forms of online interactive communications are at times inconvenient because the instant-messaging or other communications programs used to initiate them are isolated from the data, for example financial data, that inspires them. Accordingly, he devised various exemplary systems, methods, interfaces and software that integrate or facilitate integration of communications functions, such as presence and communication initiation, into data displays. Ultimately, one of more of these or other embodiments promise improved efficiency and convenience of online interactions not only for financial trading partners and others in the financial-services industry, but also for those in any private, public, and commercial domain where rapid or convenient online communication is desirable.

The embodiments described above are intended only to illustrate and teach one or more ways of making and using the present invention, not to restrict its breadth or scope. The actual scope of the invention, which embraces all ways of practicing or implementing the teachings of the invention, is defined only by one or more issued patent claims and their equivalents.

The invention claimed is:

1. A method comprising:
    receiving, from a sender, an indication of interest (IOI);
    determining a plurality of instant messenger applications via which the sender of the IOI is currently available to communicate;
    determining that at least one instant messenger application of the plurality instant messenger applications via which the sender of the IOI is currently available to communicate is a preferred instant messenger application;
    displaying an interactive control, wherein the interactive control is configured to:
        specify information describing the IOI, wherein the specified information describing the IOI is retrieved from the IOI,
        specify a plurality of presence indicators, wherein each presence indicator indicates a status of the sender of the IOI regarding a respective instant messenger application of the plurality of instant messenger applications, and wherein a status regarding a respective instant messenger application indicates whether the sender of the IOI is currently available to communicate via the respective instant messenger application, and
        specify a preference indicator for the at least one instant messenger application, wherein the preference indicator indicates that the at least one instant messenger application is a preferred instant messenger application; and
    based on a user's selection of the interactive control, initiating an instant messenger session including at least the user and the sender, wherein the instant messenger session is initiated in the preferred at least one instant messenger application of the plurality of instant messaging applications via which the sender of the IOI is currently available to communicate, and wherein the initiating the instant messenger session includes automatically populating at least one field associated with the instant messenger session with data retrieved from the IOI.

2. The method of claim 1 wherein the instant messenger session is initiated in at least two of the plurality of instant messaging applications that the sender of the IOI is currently signed-into and through which the sender of the IOI is currently available to communicate.

3. A system comprising:
    a processor operable to receive from a sender an indication of interest (IOI), operable to determine a plurality of instant messenger applications via which the sender of the IOI is currently available to communicate, and operable to determine that at least one instant messenger application of the plurality instant messenger applications via which the sender of the IOI is currently available to communicate is a preferred instant messenger application; and a display operable to display an interactive control, wherein the interactive control is configured to specify information describing the IOI, wherein the displayed information is retrieved from the IOI, operable to display a plurality of presence indicators, wherein each presence indicator indicates a status of the sender of the IOI regarding a respective instant messenger application of the plurality of instant messenger applications, and wherein a status regarding a respective instant messenger application indicates whether the sender is currently available to communicate via the respective instant messenger application, and operable to display a preference indicator, wherein the preference indicator indicates which instant messenger application is a preferred instant messenger application, and wherein the processor is further operable to, based on user selection of the interactive control, initiate an instant messenger session including at least the user and the sender, wherein the instant messenger session is initiated in the preferred at least one instant messenger application of the plurality of instant messaging applications via which the sender of the IOI is currently available to communicate, wherein the initiation of the instant messenger session includes automatically populating at least one field associated with the instant messenger session with data retrieved from the IOI.

4. The system of claim 3 wherein the instant messenger session is initiated in at least two of the plurality of instant messaging applications that the sender of the IOI is currently signed-into and through which the sender of the IOI is currently available to communicate.

* * * * *